United States Patent [19]
Krist

[11] 4,100,823
[45] Jul. 18, 1978

[54] AUTOMATIC TRANSMISSION

[76] Inventor: John Krist, 618 Tedwyn Dr., Mississauga, Ontario, Canada, L5A 1K2

[21] Appl. No.: 673,921

[22] Filed: Apr. 5, 1976

[51] Int. Cl.² ............................................. B60K 41/16
[52] U.S. Cl. ........................................ 74/863; 60/350; 74/645
[58] Field of Search ................... 60/349, 350; 74/863, 74/645

[56] References Cited
U.S. PATENT DOCUMENTS

| 2,671,543 | 3/1954 | Bosch | 60/350 |
|---|---|---|---|
| 3,103,129 | 9/1963 | Egbert et al. | 74/645 |
| 3,398,607 | 8/1968 | Chana | 74/645 |

*Primary Examiner*—Stephen C. Bentley
*Attorney, Agent, or Firm*—Robert D. Farkas

[57] ABSTRACT

An automatic transmission for engine driven vehicles, in which there is a torque converter and a planetary gear system, and linkage means whereby the leverage between the fluid torque converter and the planetary system is controlled by a vacuum generated by the varying torque of the engine under various load conditions. It includes a primary impeller and turbine, and a secondary impeller and turbine, the latter turbine being movable in variable spacing from the secondary impeller, to vary the torque therebetween, the secondary turbine being coupled to an annular ring gear which also intermeshes with planetary pinions rotatable about a sun gear, which movement is controlled by the engine manifold vacuum and accelerator.

4 Claims, 2 Drawing Figures

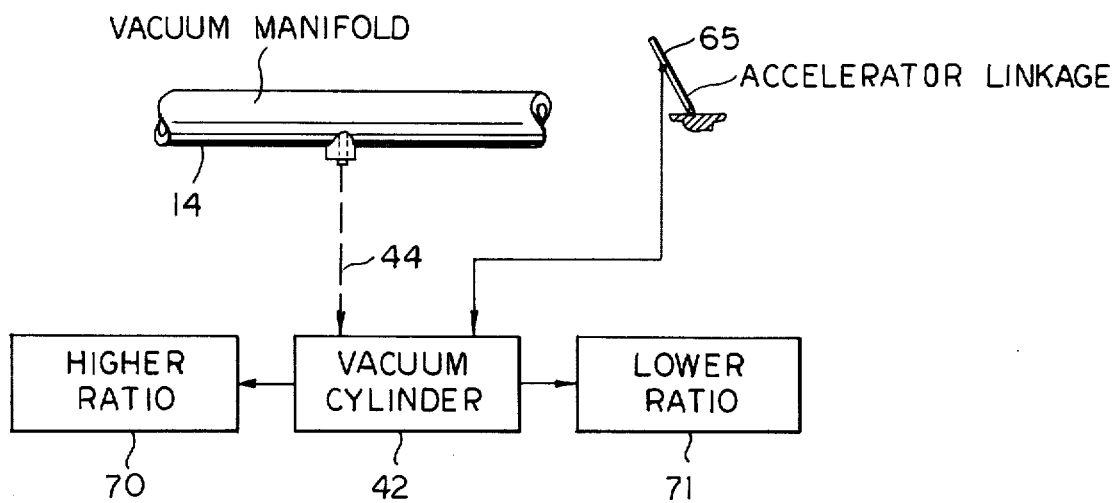

AUTOMATIC TRANSMISSION

BACKGROUND OF THE INVENTION

This invention relates to improvements in automatic transmissions especially for motor vehicles.

In connection with the use of motor vehicles, many attempts have been made to accomplish automatic gear transmission between the engine crankshaft and the drive shaft of the vehicle, so as to avoid use of hand gear shifting. Many such transmissions have been made up of considerable numbers of parts and subject to mechanical failures due to breakdowns of individual parts so that the vehicle is out of service for a time until repaired.

The present invention provides an automatic transmission which is made of very few parts and employs fluid impeller and turbine construction in conjunction with planetary gear arrangement which is in turn controlled by the engine manifold vacuum under various load conditions. This construction makes it possible for a smaller engine to be made which can give rapid acceleration and performance at any gear ratio level so that, for example, a one hundred horsepower motor could drive a large truck.

SUMMARY OF THE INVENTION

An object of the present invention is to provide a novel and improved automatic transmission for automobile engines and the like which is of simplified construction consisting of fewer parts than common existing automatic transmissions.

Another object of the present invention is to provide a novel and improved automatic transmission for engines in which there is a torque converter and a planetary gear system and means whereby the leverage between the torque converter and the planetary system is controlled by a vacuum generated by the torque of the engine.

A further object of the present invention is to provide a novel and improved automatic transmission for engines in vehicles, which will shift itself into numerous gear ratio according to the desires of the operator and the load conditions.

Still another object of the present invention is to provide a novel and improved automatic transmission for engines of vehicles, in which there is a fluid coupling unit and planetary gear system, the leverage part of the transmission being controlled by the vacuum of the gasoline motor, so as to be able to automatically adjust to the torque of the motor.

Still a further object of the present invention is to provide a novel and improved automatic transmission for engines, which is simple in design, made up of relatively few parts which can be made by mass production methods at low cost and which can be used with most types of internal combustion engines.

BRIEF DESCRIPTION OF THE DRAWINGS

The above and other objects, features and advantages of the present invention will become more apparent from the detailed description of the drawings, wherein:

FIG. 1 is a schematic and block diagram of some of the relevant portions of the invention as applied to an engine; and FIG. 2 is a sectional elevational view of an automatic transmission for conducting power from the engine crankshaft to the drive shaft of the vehicle.

DETAILED DESCRIPTION OF THE PREFERRED EMBODIMENT

In order to more clearly understand the nature of the present invention, and the best means for carrying it out, reference may be had to the drawings in which like numerals denote similar parts throughout the several views.

As shown, there is an engine crankshaft 10 of a motor vehicle which is to be coupled to deliver power to the drive shaft 12 of the vehicle which in turn is coupled through differential gears to the rear or front axle of the vehicle for driving the vehicle forward or in reverse, in dependence upon the shifting of the gears. The problems include controlling the operation with the aid of the engine derived vacuum from manifold 14, so that as the engine torque decreases, the vacuum increases and herein means are provided so that the speed of the internal ring gear 16 will increase until a one-to-one ratio is achieved.

Similarly, increase of engine torque will decrease the internal ring gear 16 speed and accordingly select a lower gear ratio, by means of the planetary gear system. As seen in FIG. 2, there is the input shaft 19 driven by power from the engine crankshaft 10 and the primary and secondary torque converter assembly 20 and 22. There is also the enclosing transmission housing 24.

As shown in FIG. 2, there is also the primary turbine rotors 25 and the secondary turbine rotors 26 which are disposed in position for being driven by the impeller rotors 28 and 29, respectively. It is seen that there is an adjustable space 30 between the impellers 29 and the turbine rotors 26, the turbine rotors 26 being carried by the annular walls 32 of the secondary turbine hollow shaft 34 through the bore of which the input shaft 19 extends.

Bearings for the various shafts are shown as needed. In order to permit varying of the interspacing 30 between the impeller 28 and the secondary turbine 26, a collar 36 is secured to the hollow shaft 34 for movement axially therewith in the directions of the arrow 37. An actuating lever 38, pivoted between its ends, at 39 extends into the annular groove 40 of collar 36 to move the collar and shaft 34 in either direction axially, depending upon the degree of vacuum in the vacuum housing 42, and the shown linkage levers, the vacuum housing 42 having a diaphragm to move the levers, depending upon vacuum sensed through duct 44 from manifold pipe 14 of the engine.

It is seen that there is a sun gear 45 rotatable by the input shaft 19 with planetary gears or pinions 46 on stub shafts 47 carried by ring flange 48 of shaft 49. An annular ring gear 50 engages the planetary pinions 46, being carried on the inner perimeter of the enlarged portion 51 of the hollow shaft 34.

As shown in FIG. 2, there is a one-way roller clutch 52 carried jointly by the hollow shaft 51 and the housing 53, so that only one-way direction of motion is possible. Governor weights 54 are supported between their ends on lugs 55 on shaft 49 with their end arms bearing against the flanges of governor sleeve 56 to maintain constant pressure on turbine 26 as it is moved axially.

As also seen in FIG. 2, the vacuum cylinder 42 is connected by duct 44 to the vacuum delivering pipe 14 from the engine manifold through control housing 60, the vacuum control unit lever arm 61 being coupled by connecting rod 62 to the accelerator pedal linkage lever 63 which in turn is coupled by lever 64 to the accelerator pedal 65. There is a governor 66 which is coupled to the accelerator and vacuum controlling duct 67 as explained hereinabove.

It is thus seen that the vacuumatic transmission will shift itself into numerous positions between high gear ratio 70 and low ratio 71 according to the desire of the operator and load conditions. A main principle of this unit is the secondary turbine 26 which is attached to the internal ring gear 50 and movable back and forth, from and toward the secondary impeller 29, which movement is controlled by the manifold vacuum in duct 44 under load conditions. As the engine torque decreases, vacuum increases and the speed of the internal ring gear 50 will increase until a one-to-one ratio is achieved.

Increase of engine torque will decrease the internal ring gear 50 speed and accordingly, cause a selection of a lower gear ratio. The vacuum is controlled by valve unit 59 which is connected with the accelerator linkage 64 and a governor 66 on the output shaft 12.

This transmission is more economical in fuel usage and is ideal for small automobiles due to less power takeoff and also for the possibility to use a smaller engine and superior equipment due to its infinite gear ratios and less wear on the engines due to the impossibility of over-torque.

Although I have described my invention in specific terms, it is understood that there are many changes, modifications and improvements which may be made herein without departing from the spirit and scope of the invention as herein described.

What is claimed is:

1. An automatic transmission for engines and vehicles having an engine crankshaft and a vehicle drive shaft, comprising transmission housing means, power input shaft means journaled in said transmission housing means for delivering power from said engine crankshaft, torque converter means in said housing means for receiving power from said input shaft means including fluid coupling unit means, said fluid coupling unit means including primary and secondary torque converter means, first impeller means, first turbine means for being driven by said first impeller means, second impeller means, second turbine means for being driven by said second impeller means, regulating means for regulating the transmission of power from said impeller means to said respective turbine means, planetary gear system means including a plurality of intermeshing gear means rotatable by power derived from said engine crankshaft, vacuum controlled means capable of connection to said engine for controlling the operation of said torque converter means and said gear system means, said vacuum control means including operation regulating housing means, first vacuum sensing duct means connectable to said regulating housing means from the engine manifold of said engine for sensing the vacuum existing therein under varying engine drive conditions, vacuum actuator diaphragm means connected to said operation regulating housing means for being actuated by varying conditions in said engine manifold, linkage lever means for coupling said vacuum actuator diaphragm means with said second turbine means for regulating the interspacing between said second impeller means and said second turbine means for regulating the torque produced therebetween, said second turbine means including second turbine shaft means movable with said second turbine means, annular ring gear means carried by said second turbine shaft means for rotation therewith, sun gear means carried by said input shaft means for rotation therewith, and planetary gear system means engageable with said sun gear means and said ring gear means for mutual adjustable degrees of intercoupling thereof.

2. An automatic transmission in accordance with claim 1, comprising one way roller clutch means engaged jointly with said annular ring gear means and said transmission housing means for constraining motion of said annular ring gear means into only one direction.

3. An automatic transmission in accordance with claim 2, comprising annular governor sleeve means supported for axial movement of said second turbine means, intermediate power transmission shaft means engaging said planetary gear system means for rotation therewith, centrifugal weight and lever speed regulating means carried by said intermediate power transmission shaft means for rotation therewith, and said weight and lever speed regulating means moving said annular governor sleeve means axially in dependence upon the speed of said intermediate power transmission shaft means.

4. An automatic transmission in accordance with claim 3, comprising gear box means engaging said intermediate power transmission shaft means and comprising gear ratio selection means, governor means connected to said gear box means and said vacuum engine manifold means and said accelerator means, and said governor means governing the selected gear box speed and direction and transmitting the same to said vehicle drive shaft.

* * * * *